US012739273B2

(12) United States Patent
Alderman et al.

(10) Patent No.: US 12,739,273 B2
(45) Date of Patent: Sep. 15, 2026

(54) NETWORK ASSET MATCHING ACROSS NETWORK PENETRATION TESTS

(71) Applicant: Horizon 3 AI, Inc., Dover, DE (US)

(72) Inventors: Robert George Alderman, Lafayette, CO (US); Levi Dyrek Payne, Woodlawn, VA (US); Chad Glinsky, Boulder, CO (US)

(73) Assignee: Horizon 3 AI, Inc., Dover, DE (US)

( * ) Notice: Subject to any disclaimer, the term of this patent is extended or adjusted under 35 U.S.C. 154(b) by 58 days.

(21) Appl. No.: 18/968,550

(22) Filed: Dec. 4, 2024

(65) Prior Publication Data

US 2026/0156135 A1 Jun. 4, 2026

(51) Int. Cl.
*H04L 29/06* (2006.01)
*H04L 9/40* (2022.01)

(52) U.S. Cl.
CPC ........ *H04L 63/1433* (2013.01); *H04L 63/145* (2013.01); *H04L 63/1466* (2013.01)

(58) Field of Classification Search
CPC ... H04L 63/1433; H04L 63/145; H04L 63/10; H04L 63/0263; H04L 63/1466; H04L 63/20
See application file for complete search history.

(56) References Cited

U.S. PATENT DOCUMENTS 10,320,624 B1 * 6/2019 Roth ..................... H04L 63/101
11,501,013 B1 * 11/2022 Das ......................... G06F 21/55

* cited by examiner

*Primary Examiner* — Longbit Chai
(74) *Attorney, Agent, or Firm* — Flare IP PLLC

(57) ABSTRACT

An autonomous pentesting agent may execute multiple autonomous pentests to gain access to network assets and obtain sets of attributes of the network assets and match network assets across the multiple autonomous pentests according to similarities between the sets of attributes. The autonomous pentesting agent may perform a network asset matching procedure to match one or more first network assets of a first set of network assets with one or more second network assets of a second set of network assets, the network asset matching procedure based on similarity scores between respective first sets of attributes of the first set of network assets and respective second sets of attributes of the second set of network assets. The autonomous pentesting agent may output a network assessment report indicating network security information associated with the network based on the network asset matching procedure.

19 Claims, 7 Drawing Sheets

First Network Assets 510

| | Network Asset 510a | Network Asset 510b | Network Asset 510c | Network Asset 510d | Network Asset 510e |
|---|---|---|---|---|---|
| Network Asset 515a | 0.32 | 0.38 | 0.40 | 0.28 | 0.40 |
| Network Asset 515b | 0.40 | 0.24 | 0.28 | 0.21 | 0.36 |
| Network Asset 515c | 0.41 | 0.27 | 0.33 | 0.30 | 0.37 |
| Network Asset 515d | 0.22 | 0.38 | 0.41 | 0.36 | 0.36 |
| Network Asset 515e | 0.29 | 0.33 | 0.40 | 0.35 | 0.39 |

Second Network Assets 515

500

First Network Assets 510

| | Network Asset 510a | Network Asset 510b | Network Asset 510c | Network Asset 510d | Network Asset 510e |
|---|---|---|---|---|---|
| Network Asset 515a | 0.32 | 0.38 | 0.40 | 0.28 | 0.40 |
| Network Asset 515b | 0.40 | 0.24 | 0.28 | 0.21 | 0.36 |
| Network Asset 515c | 0.41 | 0.27 | 0.33 | 0.30 | 0.37 |
| Network Asset 515d | 0.22 | 0.38 | 0.41 | 0.36 | 0.36 |
| Network Asset 515e | 0.29 | 0.33 | 0.40 | 0.35 | 0.39 |

Second Network Assets 515

NETWORK ASSET MATCHING ACROSS NETWORK PENETRATION TESTS

BACKGROUND

In networking, penetration testing or "pentesting" refers to conducting security operations that simulate a cybersecurity attack in order to identify vulnerabilities in a network. The goal of pentesting is to mimic the actions of a malicious actor and discover loopholes or other vulnerabilities before they can be exploited. Pentesting may include techniques such as scanning for vulnerabilities, testing system configurations and security protocols, and attempting controlled attacks to evaluate defense mechanisms within a network. Network administrators can remediate vulnerabilities uncovered during pentesting to prevent malicious actors from compromising network security using those vulnerabilities. Practicing regular pentesting can aid in maintaining high security standards, protecting sensitive data, and ensuring the continuity of network services.

SUMMARY

The described techniques relate to improved methods, systems, devices, and apparatuses that support network asset matching across network pentests.

A method for network asset matching by an apparatus is described. The method may include executing a first autonomous pentest of a network, wherein executing the first autonomous pentest may include operations, features, means, or instructions for gaining unauthorized access to a first set of network assets of the network and obtaining respective first sets of attributes for the first set of network assets, executing a second autonomous pentest of the network, wherein executing the second autonomous pentest may include operations, features, means, or instructions for gaining unauthorized access to a second set of network assets of the network and obtaining respective second sets of attributes for the second set of network assets, performing a network asset matching procedure to match one or more first network assets of the first set of network assets with one or more second network assets of the second set of network assets, the network asset matching procedure based at least in part on similarity scores between the respective first sets of attributes and the respective second sets of attributes, and outputting a network assessment report indicating network security information associated with the network based at least in part on the network asset matching procedure.

An apparatus for network asset matching is described. The apparatus may include one or more memories storing processor executable code, and one or more processors coupled with the one or more memories. The one or more processors may individually or collectively be operable to execute the code to cause the apparatus to execute a first autonomous pentest of a network, wherein, to execute the first autonomous pentest, the one or more processors are individually or collectively operable to execute the code to cause the apparatus to gain unauthorized access to a first set of network assets of the network and obtain respective first sets of attributes for the first set of network assets, execute a second autonomous pentest of the network, wherein, to execute the second autonomous pentest, the one or more processors are individually or collectively operable to execute the code to cause the apparatus to gain unauthorized access to a second set of network assets of the network and obtain respective second sets of attributes for the second set of network assets, perform a network asset matching procedure to match one or more first network assets of the first set of network assets with one or more second network assets of the second set of network assets, the network asset matching procedure based at least in part on similarity scores between the respective first sets of attributes and the respective second sets of attributes, and output a network assessment report indicating network security information associated with the network based at least in part on the network asset matching procedure.

Another apparatus for network asset matching is described. The apparatus may include means for executing a first autonomous pentest of a network, wherein the means for executing the first autonomous pentest comprise means for gaining unauthorized access to a first set of network assets of the network and means for obtaining respective first sets of attributes for the first set of network assets, means for executing a second autonomous pentest of the network, wherein the means for executing the second autonomous pentest comprise means for gaining unauthorized access to a second set of network assets of the network and means for obtaining respective second sets of attributes for the second set of network assets, means for performing a network asset matching procedure to match one or more first network assets of the first set of network assets with one or more second network assets of the second set of network assets, the network asset matching procedure based at least in part on similarity scores between the respective first sets of attributes and the respective second sets of attributes, and means for outputting a network assessment report indicating network security information associated with the network based at least in part on the network asset matching procedure.

A non-transitory computer-readable medium storing code for network asset matching is described. The code may include instructions executable by one or more processors to execute a first autonomous pentest of a network, wherein the instructions to execute the first autonomous pentest are executable to gain unauthorized access to a first set of network assets of the network and obtain respective first sets of attributes for the first set of network assets, execute a second autonomous pentest of the network, wherein the instructions to execute the second autonomous pentest are executable to gain unauthorized access to a second set of network assets of the network and obtain respective second sets of attributes for the second set of network assets, perform a network asset matching procedure to match one or more first network assets of the first set of network assets with one or more second network assets of the second set of network assets, the network asset matching procedure based at least in part on similarity scores between the respective first sets of attributes and the respective second sets of attributes, and output a network assessment report indicating network security information associated with the network based at least in part on the network asset matching procedure.

BRIEF DESCRIPTION OF THE DRAWINGS

FIG. 5 shows an example of an asset matching matrix that supports network asset matching across network pentests in accordance with aspects of the present disclosure.

DETAILED DESCRIPTION

Figure 1:
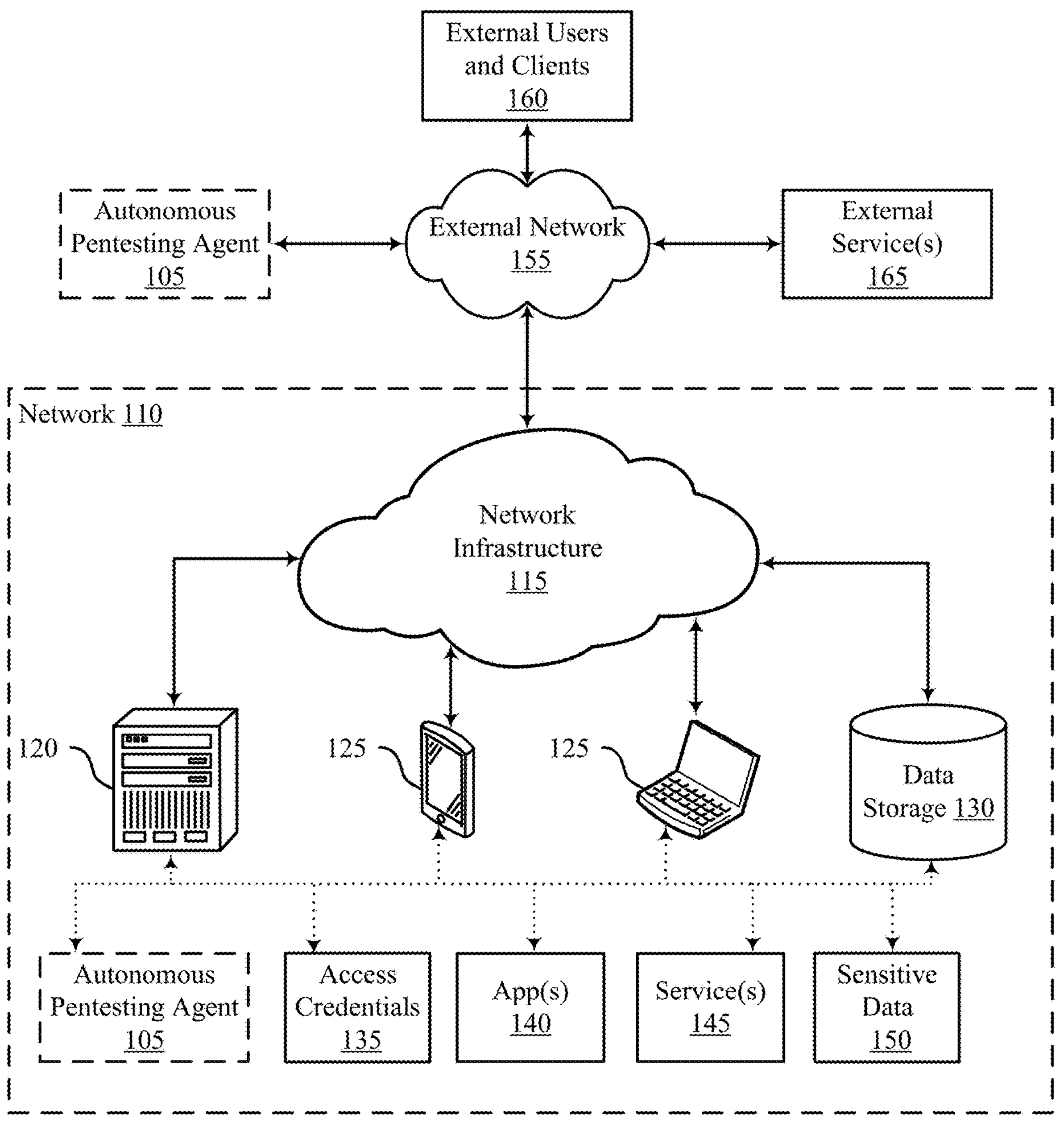
FIG. 1 shows an example of a computing environment that supports network asset matching across network pentests in accordance with aspects of the present disclosure.

A pentesting agent may perform a pentest of a network that includes multiple network assets. The pentest may identify weaknesses and vulnerabilities of the network by attempting to gain unauthorized access to various network assets. Based on the weaknesses and vulnerabilities identified during the pentest, security mitigations may be applied to the network. For example, an administrator of the network or a security service may deploy security solutions to or within the network to address weaknesses and vulnerabilities identified by an initial pentest. In some cases, the pentesting agent may perform an additional pentest of the network to evaluate whether the security mitigations or solutions that were applied after the initial pentest have been effective (e.g., whether the security mitigations or solutions blocked unauthorized access to the network assets or addressed vulnerabilities identified by the initial pentest). That is, the pentesting agent may perform the additional pentest after the security mitigations are applied, and weaknesses and vulnerabilities identified during the additional pentest may be compared to the initial pentest. However, in some cases, aspects of the network may change between the initial pentest and the additional pentest. For example, the initial pentest may identify a network asset having attributes such as a host name, a media access control (MAC) address, or the like. In the additional pentest, the pentesting agent may identify the same network asset, but one or more of the attributes may be different (e.g., the network asset identified in the additional pentest may have a same host name but a different MAC address). In such cases, the pentesting agent may be unable to classify the network asset identified in the additional pentest as being the same network asset as that which was identified in the initial pentest due to the change in attributes. Additionally, when evaluating the results of the additional pentest (or one or more subsequent pentests), the administrator or the security service may be unable to determine whether the deployed security mitigations were effective. Accordingly, techniques described herein support matching of network assets across network pentests such that security mitigations deployed between pentests may be accurately evaluated.

An autonomous pentesting agent may perform multiple autonomous pentests and match network assets across the autonomous pentests. For example, the autonomous pentesting agent may perform the initial pentest and identify network vulnerabilities. A client (e.g., the administrator, the security service, etc.) may implement security solutions to address the identified network vulnerabilities. After the security solutions are implemented, the autonomous pentesting agent may perform an additional pentest (e.g., on the same network) to verify the efficacy of the security solutions. As attributes of network assets may change between the initial pentest and the additional pentest, the autonomous pentesting agent may perform a network asset matching procedure to match network assets across the pentests based on similarity scores between the network assets identified during the initial pentest and the additional pentest.

For example, the autonomous pentesting agent may, during a first autonomous pentest, gain unauthorized access to first network assets of a network and obtain attributes for each of the first network assets. The autonomous pentesting agent may then execute a second, subsequent autonomous pentest, during which the autonomous pentesting agent may gain unauthorized access to access to second network assets of the network and obtain attributes for each of the second network assets. The autonomous pentesting agent may determine similarity scores between each network asset of the first network assets and each network asset of the second network assets. Based on the similarity scores, the autonomous pentesting agent may match one or more network assets from the first network assets with one or more network assets from the second network assets and output a network assessment report indicating network security information associated with the network based on the matches. For example, the network assessment report may identify or include changes in the network, such as changes in security vulnerabilities, between the first autonomous pentest and the second autonomous pentest.

FIG. 1 illustrates an example of a computing environment 100 that supports network asset matching across network pentests in accordance with aspects of the present disclosure. The computing environment 100 may include an autonomous pentesting agent 105 that performs an autonomous pentest of a network 110. The network 110 may include one or more devices or systems, such as a network infrastructure 115, server 120, computing devices 125, data storage 130, or any combination thereof. The devices or systems of the network 110 may be configured to access or provide various network information and services, such as access credentials 135, app(s) 140, service(s) 145, sensitive data 150, or any combination thereof.

The network 110 may allow the server 120, the computing devices 125, and the data storage 130 to communicate (e.g., exchange information) with one another. For example, the network infrastructure 115 may include any quantity of communications links and any quantity of hubs, bridges, routers, switches, ports, or other physical or logical network components that support communication between the server 120, computing devices 125, and data storage 130 of the network 110 as well as communication between the network 110 (e.g., the private network) and an external network 155 (e.g., the Internet). The network 110 may include aspects of one or more wired networks, one or more wireless networks (e.g., cellular networks), or any combination thereof. The network 110 may include aspects of one or more public networks or private networks, as well as secured or unsecured networks, or any combination thereof. For example, the network 110 may be an example of a private network that includes one or more public-facing or external assets that are accessible via an external network 155. As an example, the external network 155 may refer to the Internet, and users, such as external users and clients 160, may access the network 110 via the external network 155 through a website or application that is on the external network 155. For example, the external users and clients 160, the external service(s) 165, or both may access network information and services via the external network 155 (e.g., via the Internet), including the access credentials 135, app(s) 140, service(s) 145, and sensitive data 150.

The network 110 may be accessible via one or more hosts. For example, hosts may be examples of real or virtual machines that are connected to and capable of accessing the network 110. Real machines may refer to machines having or made up of hardware components including a central processing unit (CPU), memory, hard drive, or the like, such as physical or tangible computers or servers (e.g., the server 120, the computing devices 125, etc.). Virtual machines may refer to software within or running on a physical computer or server using portions of the CPU, memory, hard drive, or the like of the physical computer or server. A physical computer or server may include or support multiple virtual machines, such as multiple tenants (e.g., in a multi-tenant environment). The server 120 and the computing devices 125 may be examples of hosts. Hosts may communicate data with other devices within the network 110 and outside of the network (e.g., with devices in an external network 155). For example, the server 120 may send data to and receive data from one or more of the computing devices 125. Additionally, or alternatively, hosts may access resources of the network 110, including the access credentials 135, app(s) 140, service(s) 145, or sensitive data 150. As used herein, hosts may refer to web hosts, cloud hosts, virtual hosts, remote hosts, or the like.

Hosts may be examples of and include network assets. As used herein, network assets refer to machines that include network shares. For example, network assets may be examples of machines (e.g., real or virtual machines) that include shares of the network 110, such as file sharing systems. Network assets may be obtained and utilized by attackers to compromise the network 110. The server 120, the computing devices 125, the data storage 130, and the access credentials 135, app(s) 140, service(s) 145, and sensitive data 150 accessible via the devices and systems of the network 110 may all be examples of network assets. For example, physical devices (e.g., servers, computing devices, data storage, etc.) and systems may be considered network assets as well as information, apps, and services accessible through physical devices and systems of the network 110.

Hosts may store, provide, or implement access credentials 135, app(s) 140, service(s) 145, sensitive data 150, or any combination thereof. In some cases, computing devices 125 on the network may access the one or more assets (e.g., access credentials 135, app(s) 140, service(s) 145, sensitive data 150, etc.) via the server 120 (e.g., via a host). Additionally, or alternatively, computing devices 125 may locally store or otherwise access the one or more assets of the network 110. For example, users of the network 110 may access app(s) 140 and service(s) 145 via the computing devices 125 directly or indirectly (e.g., via a connection between the computing devices 125 and the server 120).

The autonomous pentesting agent 105 may perform a pentest of the network 110. As used herein, a penetration test or a "pentest" may refer to one or more security operations that simulate a cybersecurity attack in order to identify vulnerabilities in the network 110. The autonomous pentesting agent 105 may perform the pentest of the network 110 using one or more artificial intelligence (AI) models. For example, the autonomous pentesting agent 105 may be "autonomous," as the autonomous pentesting agent 105 may perform the pentest without a requirement of hard-coding, user inputs, or the like and, instead, by using the one or more AI models. The autonomous pentesting agent 105 may identify, via the pentest, security vulnerabilities of the network 110. An example of an output of the pentest may be described in greater detail elsewhere herein, including with reference to FIG. 2.

The autonomous pentesting agent 105 may, via the one or more AI models, determine and implement an attack path for a pentest. For example, the autonomous pentesting agent 105 may identify or select an asset of the network 110 to attempt to access initially and, from that asset, another asset to attempt to access, and so on. In other words, the autonomous pentesting agent 105 may use the one or more AI models to mimic decisions of an attacker. The one or more AI models may output a targeted asset of the network 110 to be subject to an access attempt by the autonomous pentesting agent 105 based on inputs including context of various assets in the network 110. In other words, the one or more AI models may output targeted assets based on the relative position of assets within the network 110, asset types, downstream assets (e.g., accessible after or through accessing a targeted asset), or the like.

The one or more AI models may be trained using data of previous pentests of the network 110 or other networks. For example, an autonomous pentesting service that deploys the autonomous pentesting agent 105 may train one or more AI models used by the autonomous pentesting agent 105 using tactics, techniques, and procedures (TTPs) of attackers (e.g., human or automated pentests), autonomous pentests performed on the network 110 previously or on other networks, or both. The autonomous pentesting agent 105 may perform improved pentests after the one or more AI models are trained using previous pentests of the network 110. That is, as the autonomous pentesting agent 105 learns more about the network 110, the autonomous pentesting agent 105 may perform pentests with higher performance levels (e.g., higher accuracy, higher quantities of potential attack paths, etc.).

In some cases, the pentest may be internal or external to the network 110. For example, the autonomous pentesting agent 105 may be deployed at a host device of the network 110 (e.g., deployed to the server 120 or computing devices 125). In such examples, the autonomous pentesting agent 105 may perform the pentest as an internal user of the network 110. Such internal pentests may be indicative of or emulate internal security threats to the network, such as from employees of an organization or an attacker that has otherwise obtained access to the network 110 internally. Alternatively, the autonomous pentesting agent 105 may be deployed at the external network 155. For example, the autonomous pentesting agent 105 may perform the pentest as an external user of the network 110, such as by accessing external or public-facing assets of the network 110 on the external network 155.

By performing the pentest autonomously via the autonomous pentesting agent 105, techniques described herein may support improved performance related to speed, identification of security vulnerabilities, and provision of remediation measures. For example, the pentest, when performed autonomously using the autonomous pentesting agent 105, may support improved performance and, by extension, improved security of the network 110 against cybersecurity attacks relative to hard-coded (e.g., automated) or manual (e.g., human operated) pentests.

As described herein, the autonomous pentesting agent 105 may match network assets of the network 110 across different autonomous pentests. Matching the network assets across autonomous pentests may enable the autonomous pentesting agent 105 to accurately report changes to the network 110 between pentests (e.g., such as between two or more pentests run (e.g., periodically) on a network over a period of time). For example, a client may implement security solutions in the network 110 (e.g., at the server 120, computing devices 125, app(s) 140, service(s) 145, etc.) and request that the autonomous pentesting agent 105 perform an additional autonomous pentest to evaluate the implemented security solutions. That is, the autonomous pentesting agent 105 may perform a second autonomous pentest of the network 110 and identify whether the security solutions are effective in mitigating one or more security vulnerabilities. To determine whether the security solutions are effective, the autonomous pentesting agent 105 may match network assets accessed during the first autonomous pentest with network assets accessed during the second autonomous pentest. In other words, the autonomous pentesting agent 105 may determine whether a network asset from the first autonomous pentest is the same as a network asset from the second autonomous pentest based on attributes obtained or identified across the first and second autonomous pentests.

By supporting network asset matching across pentests, techniques described herein may improve accuracy of network assessment reporting. For example, the autonomous pentesting agent 105 may identify changes between a first autonomous pentest and a second autonomous pentest, including absences of security vulnerabilities or weaknesses, whether a same network asset was accessed in each pentest, security vulnerabilities or weaknesses introduced due to a change in the network, or the like. By accurately identifying the changes in the network 110, techniques described herein may support improved network security. Additionally, by autonomously matching network assets across pentests, techniques described herein may reduce resource overhead and computational complexity associated with manually labeling network assets or manually identifying whether network assets are the same across autonomous pentests.

Figure 2:
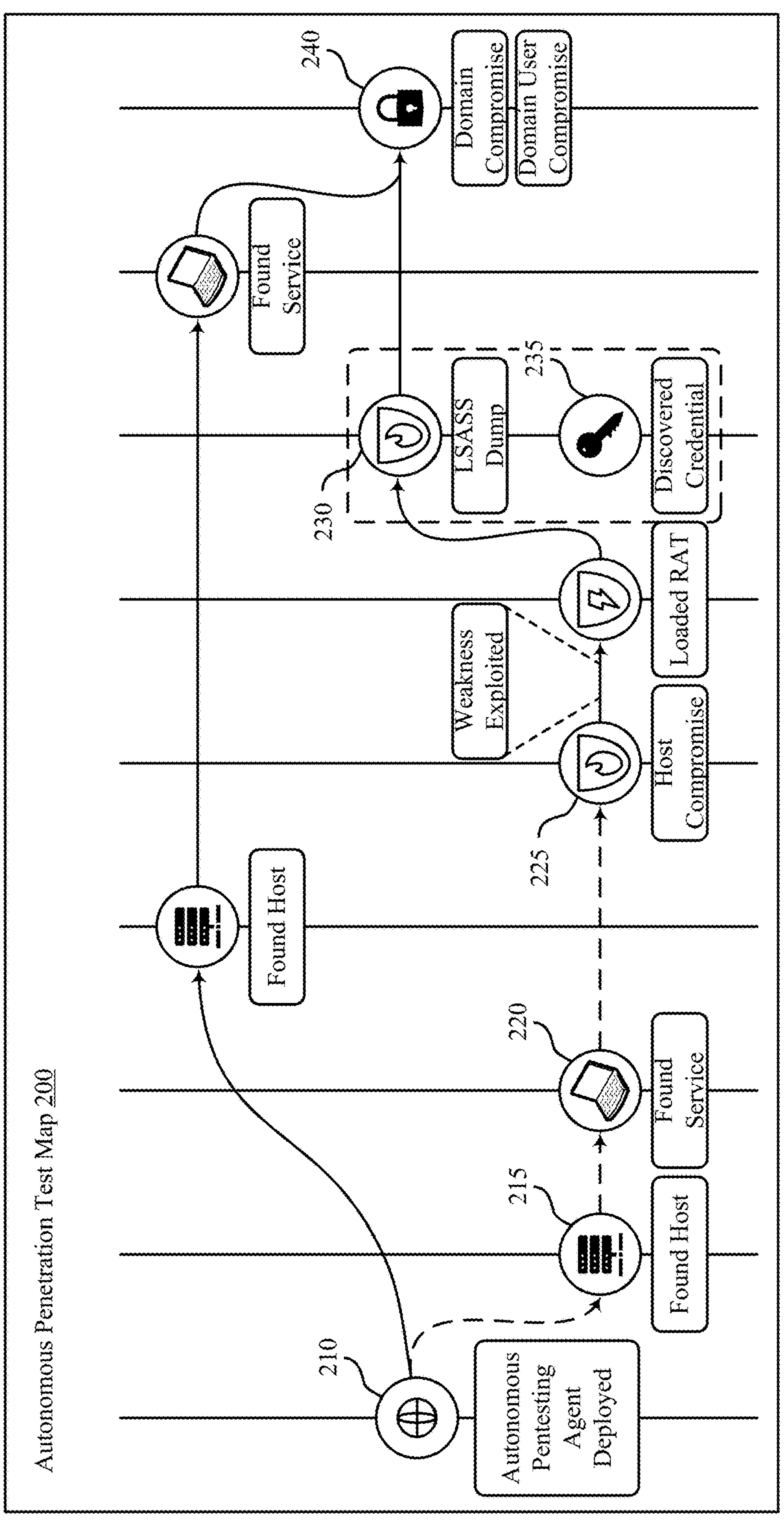
FIG. 2 shows an example of an autonomous pentest map that supports network asset matching across network pentests in accordance with aspects of the present disclosure.

FIG. 2 shows an example of an autonomous pentest map 200 that supports network asset matching across network pentests in accordance with aspects of the present disclosure. The autonomous pentest map 200 may be an example of an output or result of an autonomous pentest performed by an autonomous pentesting agent, such as a pentest performed by the autonomous pentesting agent 105 in the network 110 as described with reference to FIG. 1. The autonomous pentest map 200 may illustrate and describe an example of events of a pentest, including operations performed by and information obtained by the autonomous pentesting agent.

The autonomous pentest map 200 may include one or more types of events. For example, the autonomous pentest map 200 may include deployment 210 (e.g., of the autonomous pentesting agent), host identification 215, service identification 220, host compromise 225, deployment of an attacker tool 230 (e.g., a remote access tool (RAT), credential identification 235, and access 240 (e.g., to a domain, a domain user, or both). The autonomous pentest map 200 includes one possible attack path including two attack branches that is generated based on an autonomous pentest. However, it is understood that any quantity of possible attack paths having any quantity of possible attack branches may be output from an autonomous pentest. In other words, the autonomous pentest map 200 may include one or more attack paths having one or more respective attack branches. In some cases, dozens, hundreds, or thousands of possible attack paths, branches, or both may be generated based on the autonomous pentest. Additionally, it is understood that while the autonomous pentest map 200 shown in FIG. 2 displays one example of an autonomous pentest for illustration, other maps including various different events, hosts, attack paths, and attack branches may result from various autonomous pentests.

In the example of the autonomous pentest map 200, the autonomous pentesting agent may identify an attack path having two attack branches. As used herein, attack "path" may be understood to refer to a series of events, set in motion by the autonomous pentest agent, that lead to a compromise of one or more components or assets of a network. Additionally, "branches" or "chains" of an attack path may refer to one or more events occurring simultaneously or in parallel that lead to the compromise. As an example, in a first attack branch of the autonomous pentest map 200, the autonomous pentesting agent may identify a host, identify a service, and compromise the host (e.g., through the service). On the compromised host, the autonomous pentesting agent may exploit a weakness identified on the service running on the host to load a RAT and remotely control the compromised host. The autonomous pentesting agent pay perform, via the RAT, a Local Security Authority Subsystem Service (LSASS) dump, allowing the autonomous pentesting agent to discover a credential. The autonomous pentesting agent may use the credential in a different branch of the attack path. For example, in a second attack branch of the autonomous pentest map 200, the autonomous pentesting agent may identify a host and, through the identified host, a service. The autonomous pentesting agent may use the discovered credentials (e.g., of the first attack branch) at the service (e.g., of the second attack branch to obtain access 240 to the domain, domain user, or both.

An autonomous pentesting service may display the autonomous pentest map 200 such that compromised assets may be identified and security measures may be put in place. In some cases, the autonomous pentesting service may provide mitigation recommendations according to the autonomous pentest map 200. As an example, the autonomous pentest map 200 may identify a particular host or service as a security vulnerability for a network by tracing the access 240 backwards to a host identification 215 event. Accordingly, the autonomous pentesting service may provide a mitigation recommendation to be applied to the host involved in the host identification 215 event, such as according to how the host was identified or how access was obtained to the host at the host compromise 225 event. Similarly, the autonomous pentesting service may provide a mitigation recommendation to be applied to the service involved in the service identification 220 event.

The autonomous pentesting service may support network asset matching across network pentests. For example, the autonomous pentesting service may provide a network assessment report that indicates changes to the network between a first autonomous pentest (e.g., an initial pentest) and a second autonomous pentest (e.g., a subsequent pentest). The autonomous pentesting service may identify changes to the network according to the autonomous pentest map 200. For example, the autonomous pentesting service may identify that a security vulnerability at a network asset in the first autonomous pentest is absent in the second autonomous pentest. Additionally, or alternatively, the autonomous pentesting service may identify a new security vulnerability at a network asset in the second autonomous pentest that was absent in the first autonomous pentest. The autonomous pentesting service may support identification of changes to the network by identifying whether network assets accessed during different autonomous pentests are the same network asset (e.g., by performing network asset matching).

Figure 3:
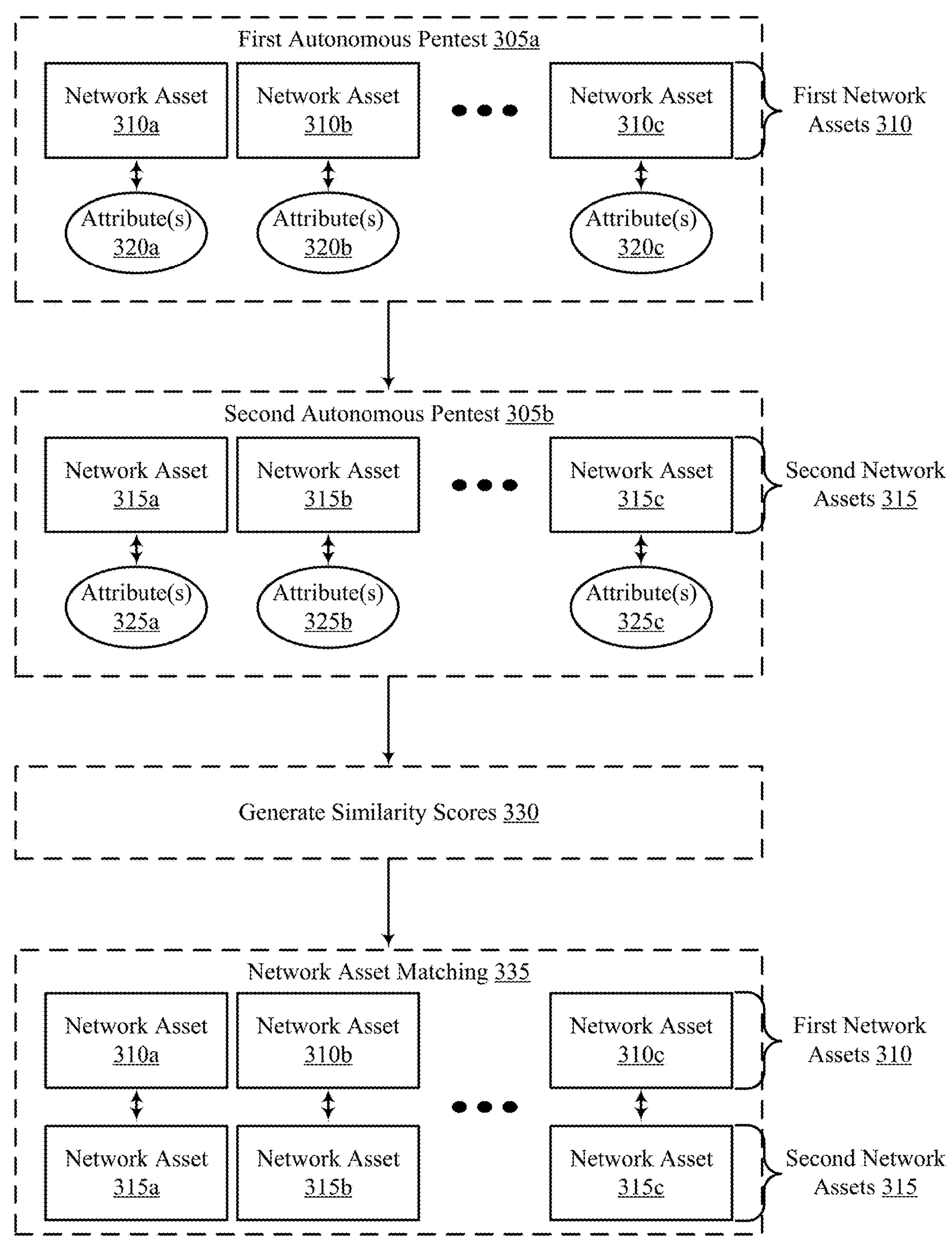
FIG. 3 shows an example of a network asset matching procedure that supports network asset matching across network pentests in accordance with aspects of the present disclosure.

FIG. 3 shows an example of a network asset matching procedure 300 that supports network asset matching across network pentests in accordance with aspects of the present disclosure. The network asset matching procedure 300 may implement or be implemented by the computing environment 100, the autonomous pentest map 200, or both. For example, the network asset matching procedure 300 may include first network assets 310 and second network assets 315, which may be examples of the network assets described with reference to FIG. 1. Additionally, the network asset matching procedure 300 may illustrate matching of first network assets 310 to second network assets 315 that are identified during different autonomous pentests of a network, such as the network 110 described with reference to FIG. 1. The autonomous pentesting agent 105 described with reference to FIG. 1 may perform one or more operations of the network asset matching procedure 300.

An autonomous pentesting agent may perform a first autonomous pentest 305*a*. The first autonomous pentest 305*a* may include gaining unauthorized access to first network assets 310, including a network asset 310*a*, a network asset 310*b*, and a network asset 310*b*. Additionally, the first autonomous pentest 305*a* may include obtaining attributes of each of the first network assets 310. For example, the first autonomous pentest 305*a* may include obtaining attribute(s) 320*a* of the network asset 310*a*, attribute(s) 320*b* of the network asset 310*b*, and attribute(s) 320*c* of the network asset 310*c*. In some examples, the autonomous pentesting agent may report results of the first autonomous pentest 305*a*. For example, the autonomous pentesting agent may output a report indicating the assets that were accessed, how access was gained, vulnerabilities and weaknesses of the network, or the like. In some examples, the report may include recommendations for security solutions to the identified vulnerabilities and weaknesses.

After the first autonomous pentest 305*a*, the autonomous pentesting agent may perform a second autonomous pentest 305*b*. The second autonomous pentest 305*b* may include gaining unauthorized access to second network assets 315, including a network asset 315*a*, a network asset 315*b*, and a network asset 315*b*. Additionally, the second autonomous pentest 305*b* may include obtaining attributes of each of the second network assets 315. For example, the second autonomous pentest 305*b* may include obtaining attribute(s) 325*a* of the network asset 315*a*, attribute(s) 325*b* of the network asset 315*b*, and attribute(s) 325*c* of the network asset 315*c*. While three network assets are shown as being accessed during each of the autonomous pentests described with reference to FIG. 3, it may be understood that any quantity of network assets may be accessed by the autonomous pentest agent during the autonomous pentests.

The first network assets 310 and the second network assets 315 may be examples of network assets described with reference to FIG. 1. In some examples, the first network assets 310, the second network assets 315, or both may include hosts. The autonomous pentesting agent may classify the network assets into asset types (e.g., hosts, databases, computing devices, app(s), services, etc.) during network asset matching 335.

The attribute(s) of each network asset of the first network assets 310 and the second network assets 315 may include a domain name system (DNS) hostname, a hostname, a network basic input/output system (NetBIOS) name, a media access control (MAC) address, an internet protocol (IP) address, machine identifier, a virtual host, virtual machine identifier(s), device fingerprint(s), hardware fingerprint(s), a subnet, a lightweight directory access protocol (LDAP) host name, elastic compute cloud instance identifier (e.g., an Amazon EC2 instance ID), a resource identifier associated with cloud assets (e.g., an Amazon resource name (ARN)), a set of services, open ports, certificate name(s), secure sockets layer (SSL) certificate(s), a set of fileshares, a set of applications (e.g., associated with or accessible via the network asset), application data, operating system(s) (e.g., operating system name(s)), flags (e.g., indicating a domain controller), pentest configuration attributes, or any combination thereof. The application data may be for web applications or applications run locally (e.g., on an internal server). For web applications, the application data may include web data such as response headers, cookies, similarity hash(es), a hash of a website provided by the network asset, or the like. Additionally, or alternatively, the pentest configuration attributes may include an identifier of the network that the autonomous pentest agent ran on, a scope of the autonomous pentest (e.g., of the entire network, of a subset of the network, of a group of network assets, etc.), runners indicating where the autonomous pentest was launched from, a launchpoint of the pentest, a pentest operation template, an indication of whether the pentest is a part of regularly scheduled operations, or any combination thereof.

In some examples, the attribute(s) may include annotations. For example, the autonomous pentesting agent may receive an indication of labels for one or more of the network assets. The labels may indicate priority levels of the one or more network assets. As an example, the autonomous pentesting agent may receive an indication that the network asset 310*a* is associated with a first priority level. The first priority level may be relatively high and, in some examples, may indicate that the network asset 310*a* is a “crown jewel” asset of the network (e.g., an asset with high importance to the network). Additionally, or alternatively, the autonomous pentesting agent may receive an indication that the network asset 315*a* is associated with the first priority level. The attribute(s) 320*a* of the network asset 310*a* and the attribute(s) 325*a* of the network asset 315*a* may include the indicated first priority level. The indications of labels for one or more of the network assets may be received by the autonomous pentesting agent prior to the first autonomous pentest 305*a*, after the first autonomous pentest 305*a* but before the second autonomous pentest 305*b*, after the second autonomous pentest 305*b*, or at multiple instances throughout the multiple autonomous pentests.

The second network assets 315 may be different than the first network assets 310. That is, the autonomous pentesting agent may gain unauthorized access to different network assets during the first autonomous pentest 305*a* and the second autonomous pentest 305*b*. In some examples, the second network assets 315 may be different than the first network assets 310 based on one or more changes to the network that occurred between the first autonomous pentest 305*a* and the second autonomous pentest 305*b*. For example, a client may implement security solutions in the network, such as based on a report provided by the autonomous pentesting agent after the first autonomous pentest 305*a*. In other words, the network may include changes or security solutions that address one or more vulnerabilities or weaknesses identified during the first autonomous pentest 305*a*. Based on the changes to the network, the second network assets 315 may be partially different than the first network assets 310 (e.g., be absent of network assets subject to the changes or security solutions).

Additionally, or alternatively, the first autonomous pentest 305*a* may have a different scope or configuration than the second autonomous pentest 305*b*. For example, the first autonomous pentest 305*a* may be an internal pentest, while the second autonomous pentest 305*b* may be an external pentest (e.g., via the Internet). In such examples, the first autonomous pentest 305*a* and the second autonomous pentest 305*b* may identify different sets of attributes for a same network asset.

In some examples, the autonomous pentesting agent may be unaware of whether the first autonomous pentest 305*a* and the second autonomous pentest 305*b* are of a same network (e.g., or scope, such as part of a network). The autonomous pentesting agent may determine whether the first autonomous pentest 305*a* and the second autonomous pentest 305*b* are of a same network based on inferences. For example, the autonomous pentesting agent may use an AI model to determine whether the first autonomous pentest 305*a* and the second autonomous pentest 305*b* are of a same network by inputting information obtained during the autonomous pentests (e.g., the assets accessed, attribute(s) of the assets, weaknesses and vulnerabilities, etc.). In instances where the autonomous pentesting agent determines that two autonomous pentests were conducted against the same network, the confidence in matching assets between those autonomous pentests may increase. However, a clients may not label the networks subject to external pentesting. In such examples, inferences may be made about whether the same network was used across pentesting operations and asset matching may proceed accordingly. In other words, the autonomous pentesting agent may perform asset matching based on an inference that the first autonomous pentest 305*a* and the second autonomous pentest 305*b* were of a same network.

In some examples, the autonomous pentesting agent may match one or more first network assets of the first network assets 310 with one or more second network assets of the second network assets 315. For example, the autonomous pentesting agent may identify changes to security vulnerabilities and weaknesses between the first autonomous pentest 305*a* and the second autonomous pentest 305*b* by identifying and reporting similarities and differences in the network assets that the autonomous pentesting agent gained unauthorized access to during each of the autonomous pentests. The autonomous pentesting agent may match one or more first network assets with one or more second network assets based on similarity scores.

For example, the autonomous pentesting agent may generate similarity scores 330. Generating the similarity scores 330 may involve comparing respective attributes of each network asset of the first network assets 310 to respective attributes of each network asset of the second network assets 315. As an example, the autonomous pentesting agent may generate similarity scores between attribute(s) 320*a* of the network asset 310*a* and attribute(s) 325*a* of the network asset 315*a*, attribute(s) 325*b* of the network asset 315*b*, and attribute(s) 325*c* of the network asset 315*c*; between attribute(s) 320*b* of the network asset 310*b* and attribute(s) 325*a* of the network asset 315*a*, attribute(s) 325*b* of the network asset 315*b*, and attribute(s) 325*c* of the network asset 315*c*; and between attribute(s) 320*c* of the network asset 310*c* and attribute(s) 325*a* of the network asset 315*a*, attribute(s) 325*b* of the network asset 315*b*, and attribute(s) 325*c* of the network asset 315*c*. Generation of the similarity scores 330 may be described in greater detail elsewhere herein, including with reference to FIG. 4.

In examples in which the first autonomous pentest 305*a* and the second autonomous pentest 305*b* have different scopes or configurations and identify different attributes at same network assets, the generating the similarity scores 330 may involve comparing attributes common to each pentesting operation. That is, in some examples, attribute(s) that are common to each pentest may be used for the similarity scores 330. Alternatively, a lack or addition of attribute(s) may be used for the similarity scores 330.

The autonomous pentesting agent may perform network asset matching 335 based on the similarity scores 330. For example, the autonomous pentesting agent may organize the similarity scores 330 into a matrix. A first dimension of the matrix may include, in each column, respective network assets of the first network assets 310, and a second dimension of the matrix may include, in each row, respective network assets of the second network assets 315. Entries in the matrix may be similarity scores between a network asset of the first network assets 310 and a network asset of the second network assets 315. An exemplary matrix and network asset matching may be described in greater detail elsewhere herein, including with reference to FIG. 5.

In the example of FIG. 3, the autonomous pentesting agent may match a network asset 310*a* with a network asset 315*a*, a network asset 310*b* with a network asset 315*b*, and a network asset 310*c* with a network asset 315*c*. In some examples, the autonomous pentesting agent may not match all of the first network assets 310 accessed during the first autonomous pentest 305*a* with all of the second network assets 315 accessed during the second autonomous pentest 305*b*. In other words, because the different autonomous pentests may access different network assets (e.g., based on changes to the network, variability in the autonomous pentesting, etc.), the autonomous pentesting agent may match a subset of (e.g., one or more of) the first network assets 310 with the second network assets 315.

The autonomous pentesting agent may output a report of the network asset matching 335. For example, the autonomous pentesting agent may report an assessment of the network indicating security information that is based on the matching. In other words, the autonomous pentesting agent may evaluate security vulnerabilities and weaknesses of the network across different autonomous pentests, where the evaluation is based on the assets being matched. As an example, the autonomous pentesting agent may report that a security vulnerability present at the network asset 310*a* during the first autonomous pentest 305*a* is absent during the second autonomous pentest 305*b* at the network asset 315*a* matched to the network asset 310*a*. Alternatively, the autonomous pentesting agent may report a new security vulnerability at the network asset 315*b* during the second autonomous pentest 305*b* that was not identified during the first autonomous pentest 305*a* at the network asset 310*b* matched to the network asset 315*b*.

After the autonomous pentesting agent matches the network assets, various interactions with a client (e.g., customer, owner of the network, member of the network, etc.) may occur. For example, the matching may provide an accurate quantity (e.g., count) of network assets, which may be used for network assessment (e.g., billing). The autonomous pentesting agent may provide a full list of network assets and associated attributes to the client for record-keeping. Additionally, or alternatively, the autonomous pentesting agent may track network security trends over time (e.g., across different autonomous pentests) using the asset matching, allowing security weaknesses and vulnerabilities to be monitored and mitigated for each network asset. In some examples, findings and conclusions from autonomous pentests (e.g., network security tests) may be correlated across autonomous pentests, such as based on the matching and an associated confidence level.

Figure 4:
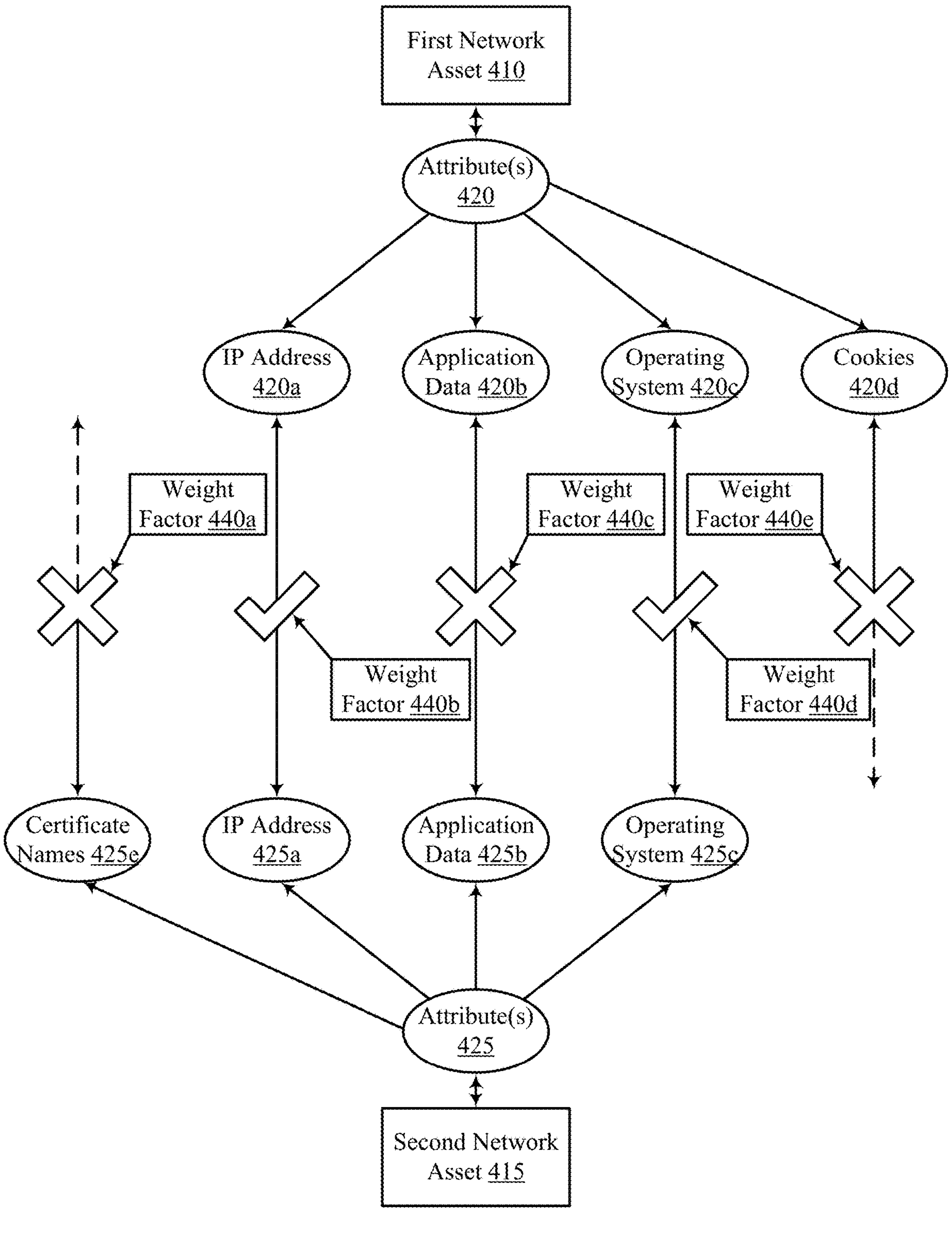
FIG. 4 shows an example of a similarity scoring that supports network asset matching across network pentests in accordance with aspects of the present disclosure.

FIG. 4 shows an example of similarity scoring 400 that supports network asset matching across network pentests in accordance with aspects of the present disclosure. The similarity scoring 400 may implement or be implemented by the computing environment 100, the autonomous pentest map 200, the network asset matching procedure 300, or any combination thereof. For example, the similarity scoring 400 may illustrate a comparison of attributes and weighting of attribute similarities across multiple attributes of network assets. The first network asset 410 and the second network asset 415 may be examples of network assets identified during different autonomous pentests, such as via the first autonomous pentest 305*a* and the second autonomous pentest 305*b* described with reference to FIG. 3. That is, the first network asset 410 may be an asset of the first network assets 310 accessed during the first autonomous pentest 305*a*, and the second network asset 415 may be an asset of the second network assets 315 accessed during the second autonomous pentest 305*b*. Additionally, the attribute(s) 420 may be examples of or include the attribute(s) 320*a*, the attribute(s) 320*b*, or the attribute(s) 320*c*, while the attribute(s) 425 may be examples of the attribute(s) 325*a*, the attribute(s) 325*b*, or the attribute(s) 325*c*.

An autonomous pentesting agent may determine a similarity score between the first network asset 410 and the second network asset 415 based on comparisons of respective attributes of each of the network assets and a weighting of each of the comparisons. For example, the first network asset 410 may have attribute(s) 420, including an IP address 420*a*, application data 420*b*, an operating system 420*c*, and cookies 420*d*. The second network asset 415 may have attribute(s) 425 including an IP address 425*a*, application data 425*b*, an operating system 425*c*, and certificate names 425*e*.

The IP address 420*a* and the IP address 425*a* as well as the operating system 420*c* and the operating system 425*c* may match. In such examples, the autonomous pentesting agent may assign a similarity score between the IP addresses and the operating systems of 1 (e.g., there is a perfect match). Alternatively, the application data 420*b* and the application data 425*b* may not match. In such examples, the autonomous pentesting agent may assign a similarity score between the application data of less than 1 (e.g., there is not a perfect match).

While the attributes in the example of FIG. 4 are illustrated as either matching or not matching, it may be understood that there may be a partial match (e.g., a similarity score between 0 and 1) for one or more of the assets. For example, the operating systems may be assigned a similarity score of less than 1 but more than 0 in examples in which the operating systems have different versions, but are a same operating system. As another example, the application data may be assigned a similarity score between 1 and 0 for having a partial match in application data (e.g., 0 being no overlapping or matching data and 1 being a complete match).

In some examples, the attribute(s) 420 of the first network asset 410 and the attribute(s) of the second network asset 415 may include different attributes. That is, the autonomous pentesting agent may identify cookies 420*d* of the first network asset 410, but no cookies for the second network asset 415. Similarly, the autonomous pentesting agent may identify certificate names 425*e* for the first network asset 410 but not for the second network asset 415. In such examples, the autonomous pentesting agent may include attributes that are common to both the first network asset 410 and the second network asset 415. That is, the difference in attributes may be based on a varying scope or configuration of an autonomous pentest during which the first network asset 410 and the second network asset 415 were identified. In such examples, the difference in attributes may not be indicative of a difference between the first network asset 410 and the second network asset 415. Rather, the difference may be attributed to the differing scope or configuration between autonomous pentests. Alternatively, the autonomous pentesting agent may include attributes that are not common to both the first network asset 410 and the second network asset 415 in the similarity score. For example, lack of an attribute at one of the first network asset 410 or the second network asset 415 when the attribute is present at the other network asset may indicate a difference between the first network asset 410 and the second network asset 415. In other words, all known attributes of the first network asset 410 and the second network asset 415 may be examined to compute a correlation factor (e.g., a similarity score between attributes).

The correlation factors (e.g., similarity scores between attributes) may be scaled according to weights associated with the attribute(s). The autonomous pentesting agent may assign weighting factors to each attribute. For example, the autonomous pentesting agent may assign a weight factor 440*a* to certificate names, a weight factor 440*b* to IP addresses, a weight factor 440*c* to application data, a weight factor 440*e* to operating systems, and a weight factor 440*e* to cookies. The autonomous pentesting agent may assign the weighting factors to each attribute based on data varying across autonomous pentests.

The autonomous pentesting agent may apply a higher weighting factor to attributes that are more likely to remain static over time. Additionally, or alternatively, the autonomous pentesting agent may apply a lower weighting factor to attributes that are more likely to be dynamic over time. As an example, the weight factor 440*d* assigned to the operating systems may be relatively higher than the weight factor 440*c* assigned to the application data, as the operating system is more likely to be the same for a given asset over time than the application data. Other attributes that may be assigned relatively high weighting factors include host names, MAC addresses, resource name identifiers (e.g., ARNs), and subnets.

The weighting factors may be manually tuned. For example, the autonomous pentesting agent may receive one or more user inputs increasing or decreasing one or more weighting factors assigned to one or more attributes. The autonomous pentesting agent may update similarity scores between network assets generated prior to receiving the user inputs, apply the updated weighting factors to subsequent asset matching procedures, or both. Additionally, or alternatively, the weighting factors may be tuned based on an AI or ML model. For example, the AI or ML model may be trained against one or more sample sets where the true network asset matchings are labeled. In other words, the AI or ML model may output weighting factors for one or more attributes (e.g., or adjustments thereof) based on an input of labeled network asset matches between autonomous pentests (e.g., or other security operations). That is, the AI or ML model may be used to identify which attributes and weighting factors correspond to successfully matching the network assets.

In some examples, the weighting factors may be based on a setup of the network (e.g., a client network setup). For example, the autonomous pentesting agent may determine the weighting factors based on identifying information about the setup of the network during autonomous pentest(s), via user input, by accessing stored information, or the like. Additionally, or alternatively, the weighting factors may be based on services running on the network. As an example, an attribute may indicate the presence of a service on the network. Such an attribute may be weighted relatively higher if fewer network assets have the service. That is, the service may be more likely to indicate a match between network assets based on relatively few network assets having the service.

The autonomous pentesting agent may determine a similarity score between the first network asset 410 and the second network asset 415. The similarity score may be a summation of the correlation factors (e.g., individual similarity scores) between each attribute of the attribute(s) 420 and the attribute(s) 425.

In some examples, the autonomous pentesting agent may group attributes into a composite attribute and assign a weighting factor to the composite attribute (e.g., rather than individual attributes). For example, the attribute(s) may include one or more composite attributes, such as a composite network attribute, a composite device attribute, and a composite resource attribute. The network composite attribute may have relatively fewer attributes compared to the composite device attribute and the composite resource attribute. However, the attributes of the network composite attribute may be relatively more significant than other attributes (e.g., more static, less likely to change over time, more likely to indicate a match, etc.). The resource composite attribute may have relatively more attributes that are relatively less significant compared to the network composite attribute (e.g., more dynamic, less likely to indicate a match, etc.). The autonomous pentesting agent may apply a same weighting factor to the network composite attribute as the resource composite attribute such that a bias towards the many attributes in the resource composite attribute may be reduced. That is, the weighting factor being applied evenly to the network composite attribute and the resource composite attribute may favor the attributes of the network composite attribute as fewer attributes are involved compared to the resource composite attribute.

The weighting factors may be based on labels. For example, the autonomous pentesting agent may receive user inputs indicating labels (e.g., customer annotations) associated with one or more network assets. In an example, the autonomous pentesting agent may receive a user input labeling the first network asset 410 as having a priority level. The label of the first priority level may be included in the attribute(s) 420 based on receiving the user input.

FIG. 5 shows an example of an asset matching matrix 500 that supports network asset matching across network pentests in accordance with aspects of the present disclosure. The asset matching matrix 500 may implement or be implemented by the computing environment 100, the autonomous pentest map 200, the network asset matching procedure 300, the similarity scoring 400, or any combination thereof. For example, the asset matching matrix 500 may illustrate a matrix of similarity scores between respective network assets identified during different autonomous pentests, such as the first network assets 310 and the second network assets 315 identified during the first autonomous pentest 305*a* and the second autonomous pentest 305*b*, respectively, described with reference to FIG. 3. That is, the first network assets 510 and the second network assets 515 may be examples of the first network assets 310 and the second network assets 315, respectively, described with reference to FIG. 3.

The asset matching matrix 500 may include, along a first dimension, first network assets 510 and, along a second dimension, second network assets 515. The asset matching matrix 500 may include entries corresponding to similarity scores between respective first network assets of the first network assets 510 and respective second network assets of the second network assets 515. As an example, a first entry in a first column and a first row of the matrix may be a similarity score between the network asset 510*a* and the network asset 515*a*. The similarity scores included in the asset matching matrix 500 may be generated for each combination of network assets using the similarity scoring described with reference to FIG. 4. For example, the similarity score generated in the example of FIG. 4 may be input as an entry to the asset matching matrix 500.

In some examples, techniques described herein may be applied to match network assets across two or more autonomous pentests. For example, the autonomous pentesting agent may perform successive matching across two or more autonomous pentests, where one or more network assets of a first autonomous pentest are matched with one or more second network assets of a second autonomous pentest. The one or more network assets matched from the first autonomous pentest and the second autonomous pentest may produce a set of combined network assets. That is, the one or more first network assets and the one or more second network assets that are matched may produce a set of combined network assets. The autonomous pentesting agent may perform a third pentest and match the set of combined network assets to one or more third network assets of the third autonomous pentest. By using the matched network assets to compare to subsequent pentests, the autonomous pentesting agent may perform the network asset matching over multiple (e.g., more than two) autonomous pentests.

After similarity scores are generated for each pairing of network assets from the first network assets 510 and network assets from the second network assets 515, an autonomous pentesting agent may match network assets such that a solution, such as an optimal matching solution, is identified. As used herein, an "optimal" matching solution may involve choosing a set of matches between network assets of a first autonomous pentest and network assets of a second autonomous pentest that maximizes a total similarity score (e.g., a sum of similarity scores of each match or pair exceeds a threshold), under a constraint that a network asset from the first autonomous pentest or the second autonomous pentest can be matched to, at most, one network asset from the other autonomous pentest. In some examples, a matching solution may include a match that is sub-optimal (e.g., similarity score below a threshold) for a given asset (e.g., not the highest similarity score possible for that asset). In such cases, the matching solution may still be acceptable (or considered optimal) because when considered amongst all other matches (and respective similarity scores for the other matches), the match may still be the highest sum total across all the matches in the first and second pentests, given the constraints or conditions. Thus, the "sub-optimal" match may contribute to a highest total similarity score across all matches and therefore may be considered a match. In some examples, the autonomous pentesting agent may apply an assignment problem algorithm (e.g., the Hungarian algorithm) to match the network assets. In the example of the asset matching matrix 500, the autonomous pentesting agent may match (e.g., based on an assignment problem algorithm) network asset 515*a* to network asset 510*b*, network asset 515*b* to network asset 510*a*, network asset 515*c* to network asset 510*e*, network asset 515*d* to network asset 510*c*, and network asset 515*e* to network asset 510*d*.

In some examples, the autonomous pentesting agent may refrain from matching one or more network assets. For example, the autonomous pentesting agent may eliminate one or more matches as being candidates in the asset matching matrix 500 based on a similarity score threshold (e.g., a minimum similarity score), a mismatch in an attribute, or both.

For example, the autonomous pentesting agent may apply a similarity score threshold. In accordance with the similarity score threshold, the matched assets 545 identified by the autonomous pentesting agent may satisfy (e.g., be greater than) the similarity score threshold. In such examples, the autonomous pentesting agent may remove one or more matches that are identified according to an assignment problem algorithm. As an example, for a similarity score threshold of 0.3, the autonomous pentesting agent may remove a match between the network asset 510*a* and the network asset 515*e* having a similarity score of 0.29. In other words, the autonomous pentesting agent, when determining security information across pentests, may determine that the network asset 510*a* and the network asset 515*e* are not the same in accordance with the similarity score being below the threshold similarity score (e.g., despite the assignment problem algorithm identifying the match).

Additionally, or alternatively, the autonomous pentesting agent may remove one or more matches based on a mismatch between one or more attributes. For example, the autonomous pentesting agent may remove one or more matches or refrain from matching network assets having a mismatch between a cloud resource name (e.g., an ARN), whether the network asset is publicly accessible (e.g., ispublic), or the like. A mismatch between such attributes may indicate that the network assets are not the same with a relatively high confidence level (e.g., compared to other attributes). In some examples, the autonomous pentesting agent may modify the similarity scores between network assets having a mismatch in a given attribute to being zero such that the assignment problem algorithm does not match the network assets (e.g., or the similarity score is below the threshold). Alternatively, the autonomous pentesting agent may refrain from matching the network assets after matching the assets according to the assignment problem algorithm. That is, the autonomous pentesting agent may remove the match and determine that the network assets are different.

Figure 6:
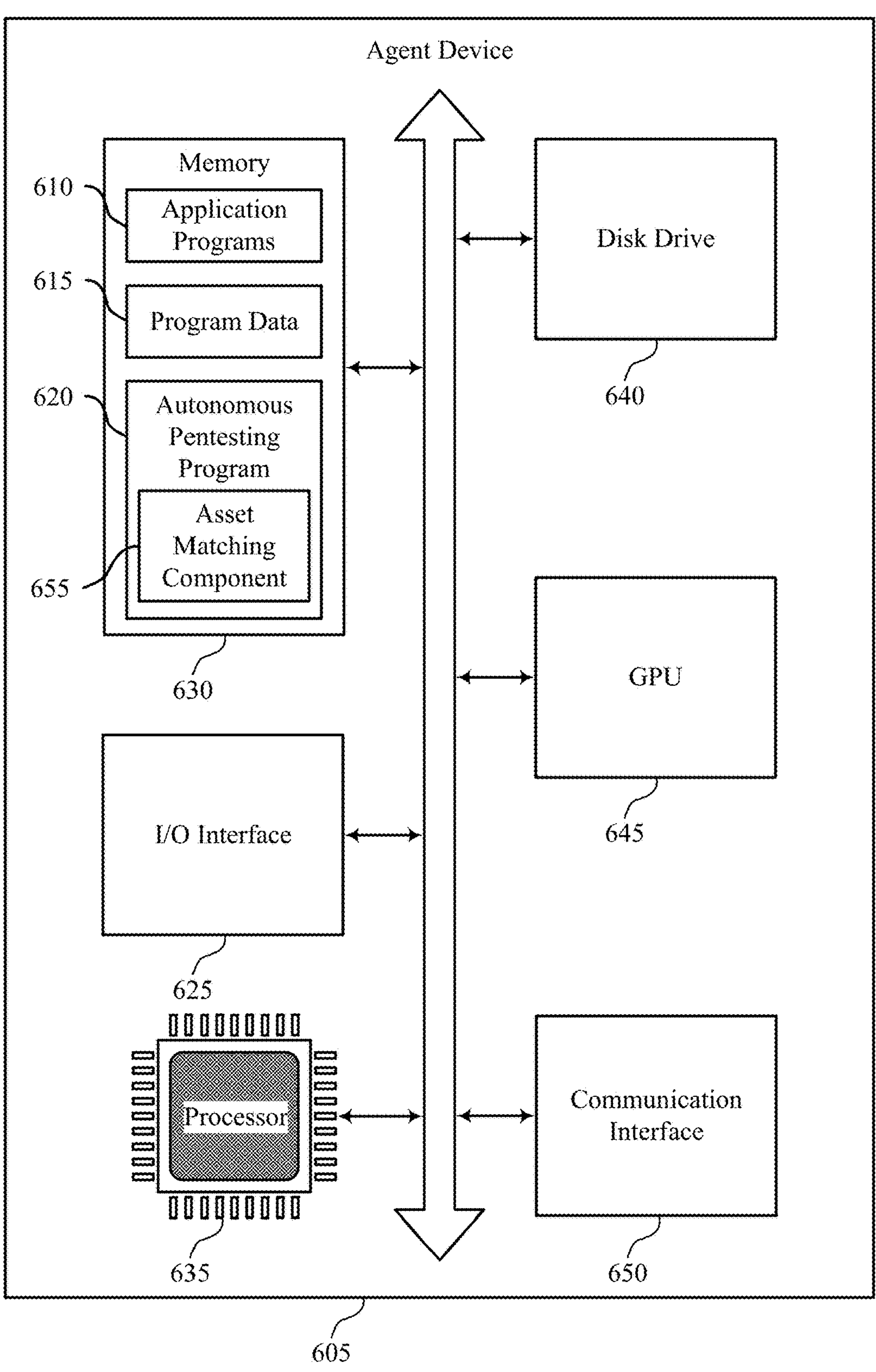
FIG. 6 shows a diagram of a system including a device that supports network asset matching across network pentests in accordance with aspects of the present disclosure.

FIG. 6 shows a diagram of a system 600 including an agent device 605 that supports network asset matching across network pentests in accordance with aspects of the present disclosure. The agent device 605 may be an example of a device or server on which an autonomous pentesting agent 105 is deployed as described herein. The agent device 605 may include components for network asset matching across network pentests, such as a memory 630 including application programs 610, program data 615, an autonomous pentesting program 620, and an asset matching component 655; an input/output (I/O) interface 625; a processor 635; a disk drive 640; a graphics processing unit (GPU) 645; and a communication interface 650. Each of these components may communicate, directly or indirectly, with one another (e.g., via one or more buses, communications links, communications interfaces, or any combination thereof).

The I/O interface 625 may support connection of the agent device 605 with one or more other devices. For example, the agent device 605 may connect to keyboards, mice, printers, hard disks, or the like via the I/O interface 625. The I/O interface 625 may communicate with the processor 635. That is, the processor 635 may process signals from devices connected to the agent device 605 via the I/O interface 625.

Memory 630 may include RAM, ROM, or both. The memory 630 may store computer-readable, computer-executable software including instructions that, when executed, cause at least one processor 635 to perform various functions described herein, such as functions supporting network asset matching across network pentests. In some cases, the memory 630 may contain, among other things, a basic I/O system (BIOS), which may control basic hardware or software operation such as the interaction with peripheral components or devices. The memory 630 may be an example of a single memory or multiple memories. For example, the agent device 605 may include one or more memories 630.

The application programs 610 in the memory 630 may be examples of app(s) 140 as described with reference to FIG. 1. For example, the application programs 610 may be installed on the memory 630 of the agent device 605, among other devices in a network. The application programs 610 may be examples of software applications or computer programs that are implemented to carry out one or more functions or tasks.

The program data 615 may be data related to the application programs 610. Program data 615 may be an example of or refer to running data of programs and applications installed on the memory 630 of the agent device 605. In some examples, the program data 615 may include various data, including code that allows the application programs 610 to perform the one or more functions or tasks.

The processor 635 may include an intelligent hardware device, (e.g., a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof). The processor 635 may be configured to execute computer-readable instructions stored in at least one memory 630 to perform various functions (e.g., functions or tasks supporting network asset matching across network pentests). Though a single processor 635 is depicted in the example of FIG. 6, it is to be understood that the system 600 may include any quantity of one or more of processors 635 and that a group of processors 635 may collectively perform one or more functions ascribed herein to a processor, such as the processor 635. The processor 635 may be an example of a single processor or multiple processors. For example, the agent device 605 may include one or more processors 635.

The disk drive 640 may be configured to store data that is generated, processed, stored, or otherwise used by the system 600. In some cases, the disk drive 640 may include one or more hard disk drives (HDDs), one or more solid-state drives (SSDs), or both. In some examples, the disk drive 640 may be an example of a single database, a distributed database, multiple distributed databases, a data store, a data lake, or an emergency backup database. In some examples, the disk drive 640 may be an example of one or more components described with reference to FIG. 1.

GPU 645 may be configured to store graphics-related data. The GPU 645 may store and manage data related to graphics and video processing. In some examples, the GPU 645 may be an example of or a component of a graphics card. The GPU 645 may use components of the memory 630, including the RAM, for temporary storage. For example, the GPU 645 may move data from the RAM of the memory 630 to the GPU 645 for graphics and video processing.

The communication interface 650 may enable the agent device 605 to exchange information (e.g., input information, output information, or both) with other systems or devices (not shown). For example, the communication interface 650 may enable the agent device 605 to connect to a network (e.g., a network 110 as described herein). The communication interface 650 may include one or more wireless network interfaces, one or more wired network interfaces, or any combination thereof.

The autonomous pentesting program 620 may be an example of a program of an autonomous pentesting service that is installed on the memory 630 of the agent device 605. The autonomous pentesting program 620 may execute an autonomous pentest of a network accessed by the agent device 605, such as accessed via the communication interface 650. That is, the autonomous pentesting program 620 may be configured to perform an autonomous pentest as described herein, including an autonomous pentest involving network asset matching.

The asset matching component 655 may support network asset matching in accordance with examples as disclosed herein. For example, the asset matching component 655 may be configured as or otherwise support a means for executing a first autonomous pentest of a network. In some examples, to execute the first autonomous pentest, the asset matching component 655 may be further configured as or otherwise support a means for gaining unauthorized access to a first set of network assets of the network and obtaining respective first sets of attributes for the first set of network assets. The asset matching component 655 may be configured as or otherwise support a means for executing a second autonomous pentest of the network In some examples, to execute the first autonomous pentest, the asset matching component 655 may be further configured as or otherwise support a means for gaining unauthorized access to a second set of network assets of the network and obtaining respective second sets of attributes for the second set of network assets. The asset matching component 655 may be configured as or otherwise support a means for performing a network asset matching procedure to match one or more first network assets of the first set of network assets with one or more second network assets of the second set of network assets, the network asset matching procedure based at least in part on similarity scores between the respective first sets of attributes and the respective second sets of attributes. The asset matching component 655 may be configured as or otherwise support a means for outputting a network assessment report indicating network security information associated with the network based at least in part on the network asset matching procedure.

By including or configuring the asset matching component 655 in accordance with examples as described herein, the agent device 605 may support techniques for improved network security.

Figure 7:
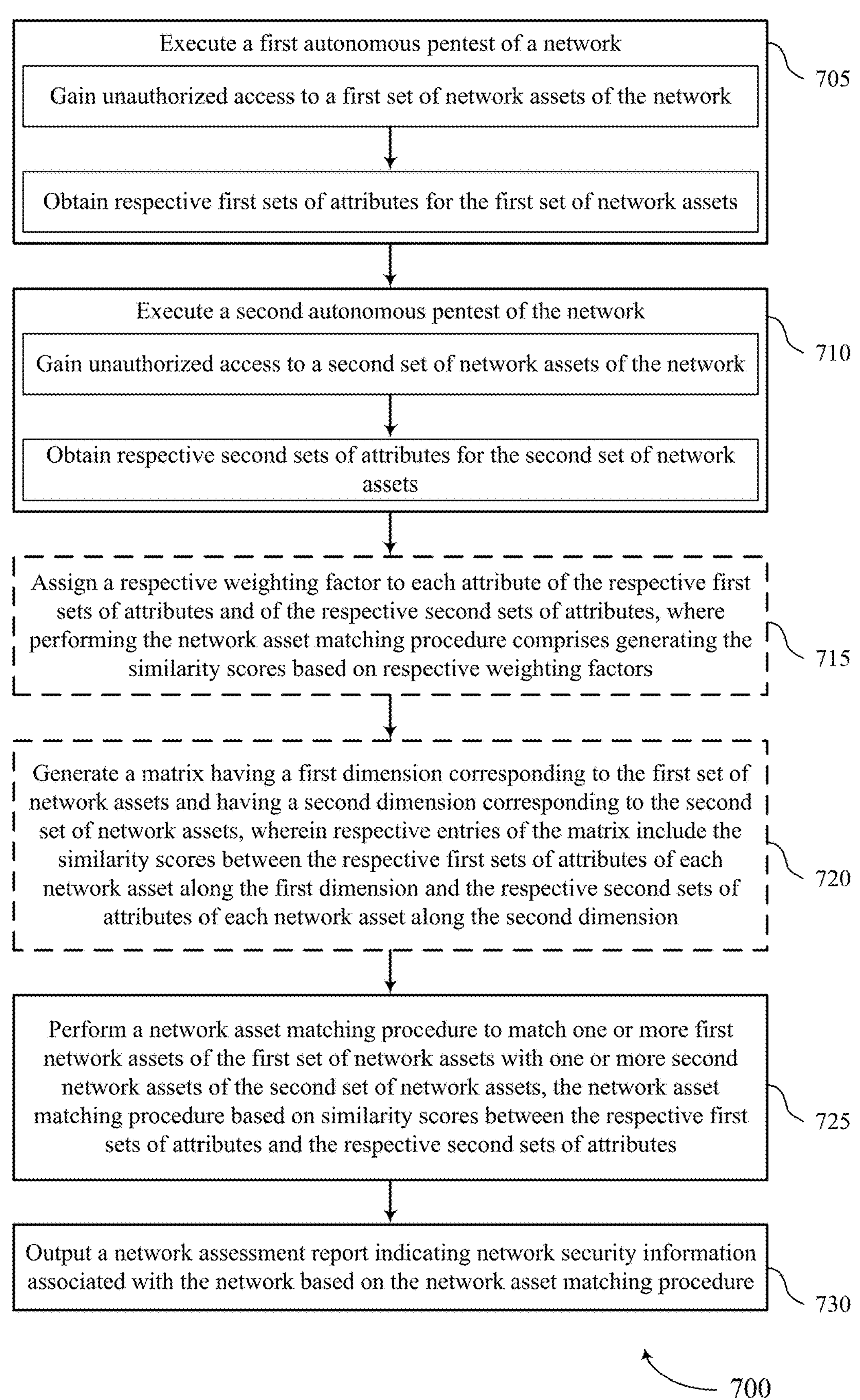
FIG. 7 shows a flowchart illustrating methods that support network asset matching across network pentests in accordance with aspects of the present disclosure.

FIG. 7 shows a flowchart illustrating a method 700 that supports network asset matching across network pentests in accordance with aspects of the present disclosure. The operations of the method 700 may be implemented by an agent device 605 or its components as described herein. In some examples, an agent device may execute a set of instructions to control the functional elements of the agent device to perform the described functions. Additionally, or alternatively, the agent device may perform aspects of the described functions using special-purpose hardware.

At 705, the method may include executing a first autonomous pentest of a network. In some examples, executing the first autonomous pentest may include gaining unauthorized access to a first set of network assets of the network and obtaining respective first sets of attributes for the first set of network assets.

At 710, the method may include executing a second autonomous pentest of the network. In some examples, executing the second autonomous pentest may include gaining unauthorized access to a second set of network assets of the network and obtaining respective second sets of attributes for the second set of network assets.

At 715, the method may include assigning a respective weighting factor to each attribute of the respective first sets of attributes and of the respective second sets of attributes, wherein performing the network asset matching procedure includes generating the similarity scores based at least in part on respective weighting factors.

At 720, the method may include generating a matrix having a first dimension corresponding to the first set of network assets and having a second dimension corresponding to the second set of network assets, wherein respective entries of the matrix comprise the similarity scores between the respective first sets of attributes of each network asset along the first dimension and the respective second sets of attributes of each network asset along the second dimension.

At 725, the method may include performing a network asset matching procedure to match one or more first network assets of the first set of network assets with one or more second network assets of the second set of network assets, the network asset matching procedure based at least in part on similarity scores between the respective first sets of attributes and the respective second sets of attributes.

At 730, the method may include outputting a network assessment report indicating network security information associated with the network based at least in part on the network asset matching procedure.

The following provides an overview of aspects of the present disclosure:

Aspect 1: A method for network asset matching, comprising: executing a first autonomous pentest of a network, wherein executing the first autonomous pentest comprises: gaining unauthorized access to a first set of network assets of the network; and obtaining respective first sets of attributes for the first set of network assets; executing a second autonomous pentest of the network, wherein executing the second autonomous pentest comprises: gaining unauthorized access to a second set of network assets of the network; and obtaining respective second sets of attributes for the second set of network assets; performing a network asset matching procedure to match one or more first network assets of the first set of network assets with one or more second network assets of the second set of network assets, the network asset matching procedure based at least in part on similarity scores between the respective first sets of attributes and the respective second sets of attributes; and outputting a network assessment report indicating network security information associated with the network based at least in part on the network asset matching procedure.

Aspect 2: The method of aspect 1, further comprising: assigning a respective weighting factor to each attribute of the respective first sets of attributes and of the respective second sets of attributes, wherein performing the network asset matching procedure comprises: generating the similarity scores based at least in part on respective weighting factors.

Aspect 3: The method of aspect 2, wherein assigning the respective weighting factor to each attribute comprises: assigning a first weighting factor to a first attribute; and assigning a second weighting factor to a second attribute, wherein the first weighting factor is greater than the second weighting factor, and wherein the first attribute is static over time relative to the second attribute.

Aspect 4: The method of any of aspects 2 through 3, wherein the respective weighting factors are determined based at least in part on a configuration of the network and on one or more services running on the network.

Aspect 5: The method of any of aspects 2 through 4, wherein assigning the respective weighting factor comprises: assigning a weighting factor to a composite attribute, the composite attribute comprising two or more attributes of the respective first sets of attributes and of the respective second sets of attributes.

Aspect 6: The method of any of aspects 2 through 5, further comprising: receiving one or more user inputs that indicate the respective weighting factors, wherein assigning the respective weighting factor to each attribute is in accordance with the one or more user inputs.

Aspect 7: The method of any of aspects 1 through 6, wherein performing the network asset matching procedure comprises: generating a matrix having a first dimension corresponding to the first set of network assets and having a second dimension corresponding to the second set of network assets, wherein respective entries of the matrix comprise the similarity scores between the respective first sets of attributes of each network asset along the first dimension and the respective second sets of attributes of each network asset along the second dimension.

Aspect 8: The method of any of aspects 1 through 7, wherein performing the network asset matching procedure comprises: identifying a mismatch between a first attribute of a first network asset of the first set of network assets and a second attribute of a second network asset of the second set of network assets, wherein a match between the first network asset and the second network asset is excluded from the match of the one or more first network assets with the one or more second network assets based at least in part on the mismatch.

Aspect 9: The method of any of aspects 1 through 8, wherein a similarity score between a first network asset of the first set of network assets and a second network asset of the second set of network assets is below a threshold, and wherein performing the network asset matching procedure comprises: excluding a match between the first network asset and the second network asset from the match of the one or more first network assets with the one or more second network assets based at least in part on the similarity score being below the threshold.

Aspect 10: The method of any of aspects 1 through 9, further comprising: calculating the similarity scores based at least in part on: calculating correlation factors between the respective first sets of attributes and the respective second sets of attributes; weighting the correlation factors based at least in part on weighting factors of each respective attribute; and calculating summations of the weighted correlation factors, wherein the similarity scores comprise the summations of the weighted correlation factors.

Aspect 11: The method of any of aspects 1 through 10, wherein outputting the network assessment report comprises: outputting the network assessment report indicating the first set of network assets accessed during the first autonomous pentest and the second set of network assets accessed during the second autonomous pentest.

Aspect 12: The method of aspect 11, wherein the network assessment report further indicates the respective first sets of attributes of each network asset of the first set of network assets and the respective second sets of attributes of each network asset of the second set of network assets.

Aspect 13: The method of any of aspects 1 through 12, wherein the respective first sets of attributes, the respective second sets of attributes, or both comprise a DNS hostname, a hostname, a NetBIOS name, a MAC address, an IP address, machine identifier, a virtual host, a virtual machine identifier, a device fingerprint, a hardware fingerprint, a subnet, a LDAP host name, elastic compute cloud instance identifier, a resource identifier associated with cloud assets, a set of services, open ports, certificate names, SSL certificates, a set of fileshares, a set of applications, application data, operating systems, flags, pentest configuration attributes, or any combination thereof.

Aspect 14: The method of any of aspects 1 through 13, wherein the first set of network assets is at least partially different from the second set of network assets.

Aspect 15: The method of any of aspects 1 through 14, wherein the first set of network assets, the second set of network assets, or both comprise sets of hosts of the network.

Aspect 16: The method of any of aspects 1 through 15, wherein performing the network asset matching procedure is based at least in part on an assignment algorithm.

Aspect 17: An apparatus for network asset matching, comprising one or more memories storing processor-executable code, and one or more processors coupled with the one or more memories and individually or collectively operable to execute the code to cause the apparatus to perform a method of any of aspects 1 through 16.

Aspect 18: An apparatus for network asset matching, comprising at least one means for performing a method of any of aspects 1 through 16.

Aspect 19: A non-transitory computer-readable medium storing code for network asset matching, the code comprising instructions executable by one or more processors to perform a method of any of aspects 1 through 16.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

The description set forth herein, in connection with the appended drawings, describes example configurations and does not represent all the examples that may be implemented or that are within the scope of the claims. The term “exemplary” used herein means “serving as an example, instance, or illustration,” and not “preferred” or “advantageous over other examples.” The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for network asset matching, comprising:

executing a first autonomous penetration test of a network, wherein executing the first autonomous penetration test comprises:

gaining unauthorized access to a first set of network assets of the network; and obtaining respective first sets of attributes for the first set of network assets;

executing a second autonomous penetration test of the network, wherein executing the second autonomous penetration test comprises:

gaining unauthorized access to a second set of network assets of the network; and obtaining respective second sets of attributes for the second set of network assets;

performing a network asset matching procedure to match one or more first network assets of the first set of network assets with one or more second network assets of the second set of network assets, the network asset matching procedure being based at least in part on similarity scores between the respective first sets of attributes and the respective second sets of attributes, wherein the network asset matching procedure excludes a match between a first network asset of the first set of network assets and a second network asset of the second set of network assets from the match of the one or more first network assets with the one or more second network assets based at least in part on a similarity score between the first network asset and the second network asset being below a threshold; and outputting a network assessment report indicating network security information associated with the network based at least in part on the network asset matching procedure.

2. The method of claim 1, further comprising:

assigning a respective weighting factor to each attribute of the respective first sets of attributes and of the respective second sets of attributes, wherein performing the network asset matching procedure comprises:

generating the similarity scores based at least in part on respective weighting factors.

3. The method of claim 2, wherein assigning the respective weighting factor to each attribute comprises:

assigning a first weighting factor to a first attribute; and assigning a second weighting factor to a second attribute, wherein the first weighting factor is greater than the second weighting factor, and wherein the first attribute is static over time relative to the second attribute.

4. The method of claim 2, wherein the respective weighting factors are determined based at least in part on a configuration of the network and on one or more services running on the network.

5. The method of claim 2, wherein assigning the respective weighting factor comprises:

assigning a weighting factor to a composite attribute, the composite attribute comprising two or more attributes of the respective first sets of attributes and of the respective second sets of attributes.

6. The method of claim 2, further comprising:

receiving one or more user inputs that indicate the respective weighting factors, wherein assigning the respective weighting factor to each attribute is in accordance with the one or more user inputs.

7. The method of claim 1, wherein performing the network asset matching procedure comprises:

generating a matrix having a first dimension corresponding to the first set of network assets and having a second dimension corresponding to the second set of network assets, wherein respective entries of the matrix comprise the similarity scores between the respective first sets of attributes of each network asset along the first dimension and the respective second sets of attributes of each network asset along the second dimension.

8. The method of claim 1, wherein performing the network asset matching procedure comprises:

identifying a mismatch between a first attribute of the first network asset of the first set of network assets and a second attribute of the second network asset of the second set of network assets, wherein the match between the first network asset and the second network asset is excluded from the match of the one or more first network assets with the one or more second network assets based at least in part on the mismatch.

9. The method of claim 1, further comprising:

calculating the similarity scores based at least in part on:

calculating correlation factors between the respective first sets of attributes and the respective second sets of attributes;

weighting the correlation factors based at least in part on weighting factors of each respective attribute; and calculating summations of the weighted correlation factors, wherein the similarity scores comprise the summations of the weighted correlation factors.

10. The method of claim 1, wherein outputting the network assessment report comprises:

outputting the network assessment report indicating the first set of network assets accessed during the first autonomous penetration test and the second set of network assets accessed during the second autonomous penetration test.

11. The method of claim 10, wherein the network assessment report further indicates the respective first sets of attributes of each network asset of the first set of network assets and the respective second sets of attributes of each network asset of the second set of network assets.

12. The method of claim 1, wherein the respective first sets of attributes, the respective second sets of attributes, or both comprise a domain name system (DNS) hostname, a hostname, a network basic input/output (NetBIOS) name, a media access control (MAC) address, an internet protocol (IP) address, machine identifier, a virtual host, a virtual machine identifier, a device fingerprint, a hardware fingerprint, a subnet, a lightweight directory access protocol (LDAP) host name, elastic compute cloud instance identifier, a resource identifier associated with cloud assets, a set of services, open ports, certificate names, secure sockets layer (SSL) certificates, a set of fileshares, a set of applications, application data, operating systems, flags, penetration test configuration attributes, or any combination thereof.

13. The method of claim 1, wherein the first set of network assets is at least partially different from the second set of network assets.

14. The method of claim 1, wherein the first set of network assets, the second set of network assets, or both comprise sets of hosts of the network.

15. The method of claim 1, wherein performing the network asset matching procedure is based at least in part on an assignment algorithm.

16. An apparatus for network asset matching, comprising:

one or more memories storing processor-executable code; and one or more processors coupled with the one or more memories and individually or collectively operable to execute the code to cause the apparatus to:

execute a first autonomous penetration test of a network, wherein, to execute the first autonomous penetration test, the one or more processors are individually or collectively operable to execute the code to cause the apparatus to:

gain unauthorized access to a first set of network assets of the network; and obtain respective first sets of attributes for the first set of network assets;

execute a second autonomous penetration test of the network, wherein, to execute the second autonomous penetration test, the one or more processors are individually or collectively operable to execute the code to cause the apparatus to:

gain unauthorized access to a second set of network assets of the network; and obtain respective second sets of attributes for the second set of network assets;

perform a network asset matching procedure to match one or more first network assets of the first set of network assets with one or more second network assets of the second set of network assets, the network asset matching procedure being based at least in part on similarity scores between the respective first sets of attributes and the respective second sets of attributes, wherein the network asset matching procedure excludes a match between a first network asset of the first set of network assets and a second network asset of the second set of network assets from the match of the one or more first network assets with the one or more second network assets based at least in part on a similarity score between the first network asset and the second network asset being below a threshold; and output a network assessment report indicating network security information associated with the network based at least in part on the network asset matching procedure.

17. The apparatus of claim 16, wherein the one or more processors are individually or collectively further operable to execute the code to cause the apparatus to:

assign a respective weighting factor to each attribute of the respective first sets of attributes and of the respective second sets of attributes, wherein performing the network asset matching procedure comprises:

generate the similarity scores based at least in part on respective weighting factors.

18. A non-transitory computer-readable medium storing code for network asset matching, the code comprising instructions executable by one or more processors to:

execute a first autonomous penetration test of a network, wherein the instructions to execute the first autonomous penetration test are executable to:

gain unauthorized access to a first set of network assets of the network; and obtain respective first sets of attributes for the first set of network assets;

execute a second autonomous penetration test of the network, wherein the instructions to execute the second autonomous penetration test are executable to:

gain unauthorized access to a second set of network assets of the network; and obtain respective second sets of attributes for the second set of network assets;

perform a network asset matching procedure to match one or more first network assets of the first set of network assets with one or more second network assets of the second set of network assets, the network asset matching procedure being based at least in part on similarity scores between the respective first sets of attributes and the respective second sets of attributes, wherein the network asset matching procedure excludes a match between a first network asset of the first set of network assets and a second network asset of the second set of network assets from the match of the one or more first network assets with the one or more second network assets based at least in part on a similarity score between the first network asset and the second network asset being below a threshold; and output a network assessment report indicating network security information associated with the network based at least in part on the network asset matching procedure.

19. The non-transitory computer-readable medium of claim 18, wherein the instructions to perform the network asset matching procedure are executable by the one or more processors to:

generate a matrix having a first dimension corresponding to the first set of network assets and having a second dimension corresponding to the second set of network assets, wherein respective entries of the matrix comprise the similarity scores between the respective first sets of attributes of each network asset along the first dimension and the respective second sets of attributes of each network asset along the second dimension.

* * * * *